United States Patent [19]

Nishimi et al.

[11] Patent Number: 5,230,561
[45] Date of Patent: Jul. 27, 1993

[54] HORIZONTAL-TYPE BIAXIAL KNEADER

[75] Inventors: Haruyuki Nishimi, Toyo; Mamoru Mishima, Niihama; Michiharu Toh, Fukuoka; Toyohiko Gondoh, Kurume, all of Japan

[73] Assignee: Sumitomo Heavy Industrie's, Ltd., Tokyo, Japan

[21] Appl. No.: 783,969

[22] Filed: Oct. 29, 1991

[30] Foreign Application Priority Data

Oct. 31, 1990 [JP] Japan ................................. 2-294946

[51] Int. Cl.$^5$ ............................. B01F 7/00; B29B 1/06
[52] U.S. Cl. ........................................ 366/97; 366/297
[58] Field of Search ............... 366/96, 97, 297–301, 366/325; 425/209, 204

[56] References Cited

U.S. PATENT DOCUMENTS 3,403,894 10/1968 Matsuoka et al. ................. 259/104
4,184,773 1/1980 Ellwood ............................. 366/300
4,871,259 10/1989 Harada .............................. 396/300

FOREIGN PATENT DOCUMENTS 2312351 12/1975 France .
1028358 5/1966 United Kingdom .
2002247 2/1979 United Kingdom .

Primary Examiner—Robert W. Jenkins
Attorney, Agent, or Firm—Nikaido, Marmelstein, Murray & Oram

[57] ABSTRACT

A horizontal-type biaxial kneader for rubber kneading and such operation. It comprises two mixing chambers provided in juxtaposed relation, which mixing chambers are connected through an interposed region below a ram and above a bridge, and rotary shafts each equipped with a rotor blade including at least two blade wings, which rotary shafts are provided in parallel to each other within the two mixing chambers, so that the content of the mixing chambers is interchanged between the mixing chambers by rotating the rotor blades in directions opposite to each other. The rotor blades have a cross-sectional configuration characterized in that a scrape angle on the rear side of the tip of each blade wing is made larger than a bite angle on the front side of the same. Thus, separation of the content from the chamber wall on the rear side of each blade wing can be favorably performed, and the interchange of the content between the rotor blades can be effectively conducted through the interposed region below the ram and the above the bridge.

4 Claims, 6 Drawing Sheets

FIG. 8
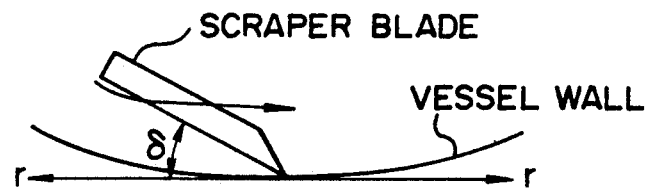
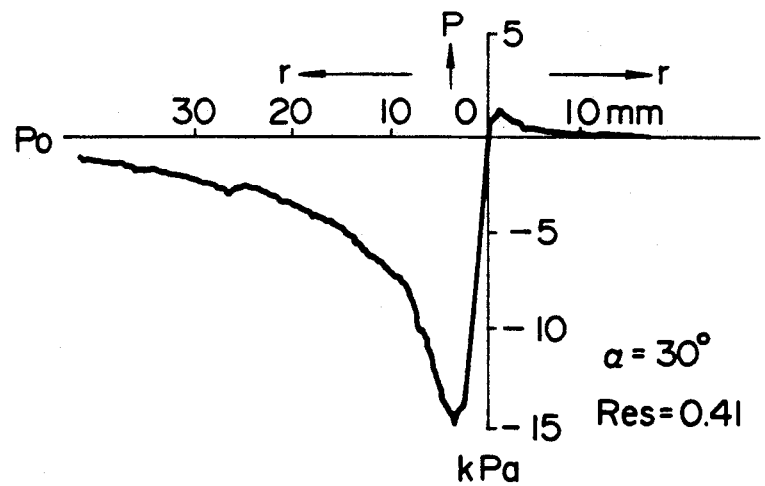
FIG. 9
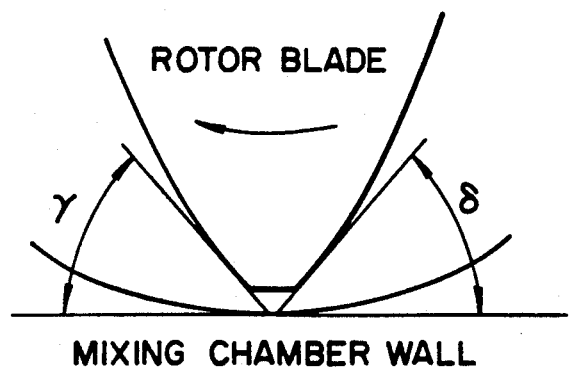

HORIZONTAL-TYPE BIAXIAL KNEADER

BACKGROUND OF THE INVENTION

1. Field of the Invention

The present invention relates to a horizontal-type biaxial kneader used for such operation as kneading rubber and, more particularly, to a horizontal-type biaxial kneader having characters in the cross-sectional configuration of rotor blades.

2. Description of the Prior Art

Conventionally, an intensive mixer (banbury type) or a horizontal-type biaxial internal kneader equipped with rotor blades having a cross-sectional configuration like a convex lens or a circle with an angular portion has been employed for such operation as kneading rubber and adding compounds.

The effect of kneading rubber by rotor blades has already been confirmed mainly by the above-mentioned banbury mixer representative of rubber kneaders. However, it has not been clear yet how the rubber kneading effect of the rotor blades is influenced by the cross-sectional configuration and size of each rotor blade, and factors of the cross-sectional configuration (for example, a tip clearance, a land width, a bite angle on the front side of the tip of the rotor blade, i.e., a front angle between the rotor blade and the chamber wall).

Besides, few attempts have been made to research changes of the mixing behavior of rubber in an interposed region below a ram and above a bridge between two rotor blades when the cross-sectional configuration of the rotor blades is different. Instead of two-dimensional mixing behavior on a cross-section of such an apparatus, three-dimensional mixing behavior in the whole apparatus has been investigated. This is because the mixing behavior of rubber in the interposed region below the ram and above the bridge varies at every rotation of the rotor blades and is highly complicated. The reason is that the rotor blades are helically deformed in the axial direction although they have one common shape, and that the two rotor blades of the internal mixer are rotated at a speed ratio of approximately 1:1.2, so that the phase difference is changed with rotations.

In a conventional horizontal-type biaxial internal kneader represented by the banbury mixer, the rotor blades have a phase difference shown in FIG. 10 only once per rotation of the rotor blades, and the number of interchanges of the content between the rotor blades is small. Further, in a rotor blade having a cross-sectional configuration shown in FIG. 12, a scrape angle on the rear side of the tip of the rotor blade, i.e., a rear angle between the rotor blade and the chamber wall, is small. The space between the rotor blade and the peripheral wall within the mixing chamber on the rear side of the rotor blade tip is narrow, and accordingly, the transfer/mixing space for the content is small. In practice, therefore, the attached content is not easily separated from the peripheral wall within the mixing chamber although a large negative pressure which is effective for separation of the content is generated on the rear side of the rotor blade tip, and mixing efficiency is extremely low. This factor inevitably results in the inconvenience that the conventional kneader has low mixing rate and unfavorable performance.

In a horizontal-type biaxial internal kneader whose rotor blades have a lens-like cross-sectional configuration, the rotor blades have a phase difference shown in FIG. 10 only once per rotation of the rotor blades, and the number of interchanges of the content between the rotor blades is small. Further, as shown in FIG. 11, the rear-side edge of each rotor blade has a convex shape. A scrape angle on the rear side of the tip of the rotor blade is large, and the space between the rotor blade and the peripheral wall within the mixing chamber on the rear side of the rotor blade tip is wide. Consequently, a negative pressure generated on the rear side of the rotor blade tip is small, and the transfer/mixing space for the content is not large enough although it is not so small as that of the above-described rotor blade having the cross-sectional configuration like a circle with an angular portion. Therefore, mixing efficiency is extremely low. This factor inevitably results in the inconvenience that this kneader has low mixing rate and unfavorable performance.

Concerning mixing operation involving scraping a highly viscous substance, the inventors of the present invention obtained a distribution of pressure generated on the front and rear sides of the tip of a scraper blade when a highly viscous fluid was scraped, through measurement of a normal stress distribution on a peripheral wall within a vessel. The result is shown in FIG. 8. Positive pressure (positive normal stress) was generated on the front side of the scraper blade tip, and negative pressure (negative normal stress) was generated on the rear side of the same. As a scrape angle $\delta$ on the rear side of the scraper blade tip became smaller, the negative pressure was more increased. The power consumption of the scraper blade was greatly influenced by the scrape angle $\delta$ on the rear side of the scraper blade tip, and it had the smallest value when the scrape angle $\delta$ was 45°. Taking this matter into account, as shown in FIG. 9, the inventors speculated that the power consumption and the mixing efficiency are considerably influenced by the pressure on a peripheral wall within a mixing chamber which varies in accordance with a bite angle $\gamma$ on the front side of the tip of a rotor blade and a scrape angle $\delta$ on the rear side of the same, and that a large positive pressure is generated when the bite angle $\gamma$ on the front side of the rotor blade tip is decreased, whereas a large negative pressure is generated when the scrape angle $\delta$ on the rear side of the rotor blade tip is decreased. Moreover, the inventors considered that, because such a large pressure difference is caused between the front and rear sides of the tip of each rotor blade, the pressure generated in a region below a ram and above a bridge significantly varies according to the positional relation (phase difference) between tips of two rotor blades when the tips of the rotating blades reach this region. Then, in order to improve the rotor blades, the inventors investigated the effect of the cross-sectional configuration of the rotor blades on rubber kneading when rotating the two rotor blades at equal speed in directions opposite to each other so as to maintain the positional relation between the rotor blade tips constantly under a certain condition.

The present invention has been achieved to solve the above-described problems, and it is an object of the invention to provide a horizontal-type biaxial kneader in which separation and mixing of the content on the rear side of each rotor blade can be favorably performed and the content can be effectively interchanged between two rotor blades through an interposed region below the ram and above the bridge between the blades.

SUMMARY OF THE INVENTION

According to the present invention, a horizontal-type biaxial kneader comprises two mixing chambers provided in juxtaposed relation, which mixing chambers are connected through an interposed region below a ram and above a bridge, and rotary shafts each equipped with a rotor blade including at least two blade wings, which rotary shafts are provided in parallel to each other and rotatably within the two mixing chambers, so that the content of the mixing chambers is interchanged between the mixing chambers by rotating the rotor blades in directions opposite to each other. The kneader is characterized in that a scrape angle $\delta$ on the rear side of the tip of each blade wing is made larger than a bite angle $\gamma$ on the front side of the same. With this structure, the above-mentioned object can be achieved.

BRIEF DESCRIPTION OF DRAWINGS

FIG. 8 is a diagram illustrating a condition of scraping by a scraper blade in mixing operation involving scraping a highly viscous substance, with a graph showing a distribution of pressure generated on the front and rear sides of the tip of the scraper blade;

FIG. 9 is a diagram showing a bite angle $\gamma$ on the front side of the tip of a rotor blade and a scrape angle $\delta$ on the rear side of the same;

DETAILED DESCRIPTION OF THE PREFERRED EMBODIMENT

Embodiments of the present invention will be now described with reference to FIGS. 1 to 5.

FIGS. 1A, 1B, 1C and 1D are cross-sectional views showing various rotor blades having different configurations, each rotor blade being attached to a rotary shaft 1.

Figure 1A:
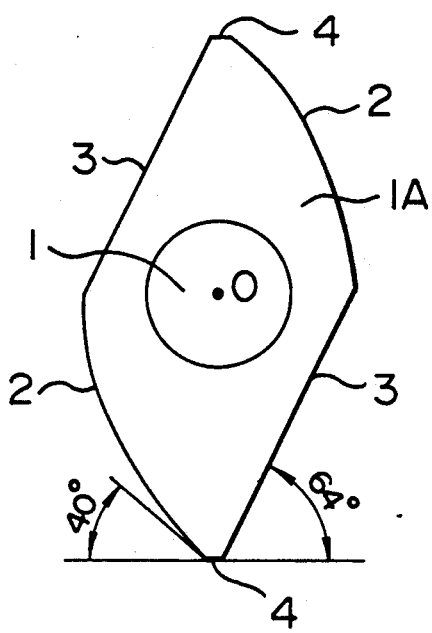
FIGS. 1A, 1B, 1C and 1D are cross-sectional views showing various rotor blades.

A rotor blade 1A shown in FIG. 1A comprises a body extending from a rotational center 0 in opposite directions so that the shape of the rotor blade will be symmetrical with respect to the rotational center 0, and it is formed to have a diameter of 92 mm and a thickness of 19.5 mm. Further, a front-side edge of each wing of the rotor blade 1A is formed having such a shape as an arcuate portion 2 leading to the tip of the blade wing, while a rear-side edge of the blade wing is formed having such a shape as a straight portion 3 leading to the tip of the blade wing. A scrape angle $\delta$ on the rear side of the blade wing tip, i.e., a rear angle between the blade wing and the chamber wall, is made larger than a bite angle $\gamma$ on the front side of the blade wing tip, i.e., a front angle between the blade wing and the chamber wall (for example, $\delta=64°$ and $\gamma=40°$). Land portions 4 are formed in parallel to peripheral walls within a mixing chamber, having a land width of 3 mm on one blade wing and a land width of 4 mm on the other blade wing.

Figure 1B:
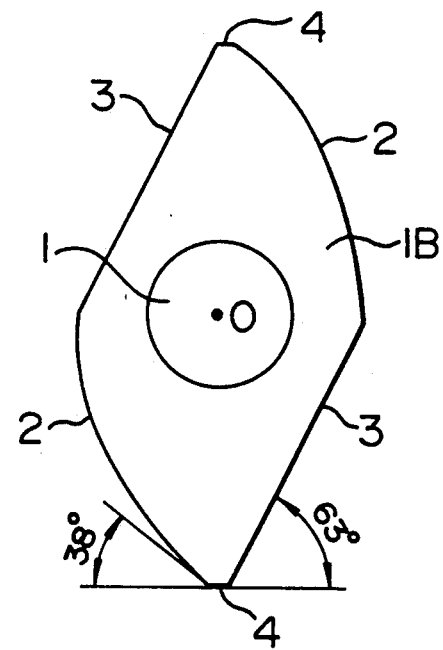

A rotor blade 1B shown in FIG. 1B comprises a body extending from a rotational center 0 in opposite directions so that the shape of the rotor blade will be symmetrical with respect to the rotational center 0, and it is formed to have a diameter of 96 mm and a thickness of 19.5 mm. Further, a front-side edge of each wing of the rotor blade 1B is formed having such a shape as an arcuate portion 2 leading to the tip of the blade wing, while a rear-side edge of the blade wing is formed having such a shape as a straight portion 3 leading to the tip of the blade wing. The scrape angle $\delta$ on the rear side of the blade wing tip is made larger than the bite angle $\gamma$ on the front side of the blade wing tip (for example, $\delta=63°$ and $\gamma=38°$). Land portions 4 are formed in parallel to peripheral walls within a mixing chamber, having a land width of 3 mm on one blade wing and a land width of 4 mm on the other blade wing.

Figure 1C:
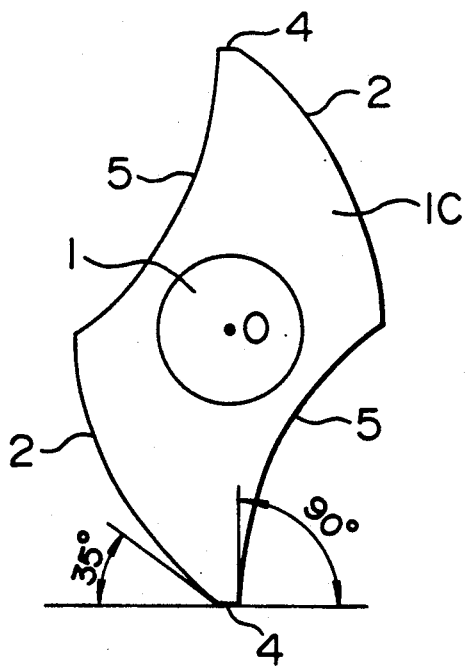

A rotor blade 1C shown in FIG. 1C comprises a body extending from a rotational center 0 in opposite directions so that the shape of the rotor blade will be symmetrical with respect to the rotational center 0, and it is formed to have a diameter of 96 mm and a thickness of 19.5 mm. Further, a front-side edge of each wing of the rotor blade 1C is formed having such a shape as an arcuate portion 2 leading to the tip of the blade wing, while a rear-side edge of the blade wing is formed having such a shape as a concave portion 5 leading to the tip of the blade wing. The scrape angle $\delta$ on the rear side of the blade wing tip is made larger than the bite angle $\gamma$ on the front side of the blade wing tip (for example, $\delta=90°$ and $\gamma=35°$). Land portions 4 are formed in parallel to peripheral walls within a mixing chamber, having a land width of 3 mm on one blade wing and a land width of 4 mm on the other blade wing.

Figure 1D:
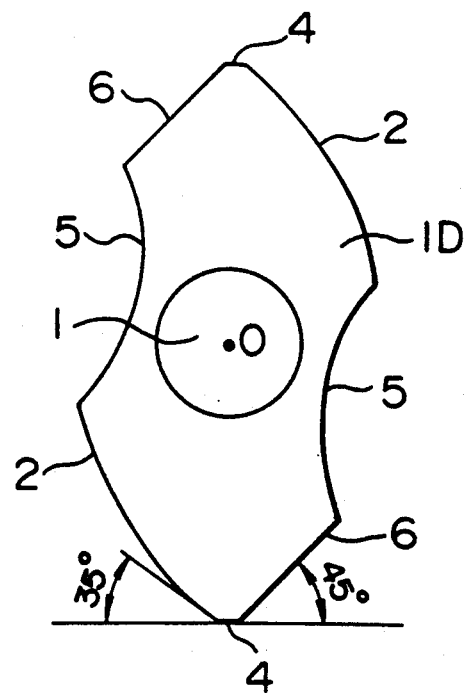

A rotor blade 1D shown in FIG. 1D comprises a body extending from a rotational center 0 in opposite directions so that the shape of the rotor blade will be symmetrical with respect to the rotational center 0, and it is formed to have a diameter of 96 mm and a thickness of 19.5 mm. Further, a front-side edge of each wing of the rotor blade 1D is formed having such a shape as an arcuate portion 2 leading to the tip of the blade wing, while a rear-side edge of the blade wing is formed having a straight portion 6 (approximately 20 mm to 25 mm long) interposed between the tip of the blade wing and a concave portion 5. The scrape angle $\delta$ on the rear side of the blade wing tip is made larger than the bite angle $\gamma$ on the front side of the blade wing tip (for example, $\delta=45°$ and $\gamma=35°$). Land portions 4 are formed in parallel to peripheral walls within a mixing chamber, having a land width of 3 mm on one blade wing and a land width of 4 mm on the other blade wing.

In the structure of each of the above-described rotor blades, the bite angle γ on the front side of the blade wing tip is 30° to 40° for the purpose of generating a positive pressure which is required for kneading rubber in a sickle-shaped zone on the front side of each blade wing and transferring it below a ram.

The scrape angle δ on the rear side of the blade wing tip is 45° to 90° for the purpose of separating rubber from the peripheral walls within the mixing chamber even if the value of a negative pressure generated is changed.

The rear-side edge of each blade wing is shaped not as a convex portion as in the conventional technique but as the straight portion 3 or the concave portion 5 or a combination of the concave portion 5 and the straight portion 6 because a space on the rear side of each blade wing is enlarged to facilitate transfer of rubber to a space on the rear side of one blade wing while the other blade wing is rotated from a region below the ram to a region above a bridge.

Moreover, the rotor blade comprises a body extending from the rotational center 0 in opposite directions so that the shape of the rotor blade will be symmetrical with respect to the rotational center 0 because the number of interchanges of rubber between the rotor blades is increased up to two times per rotation of the rotor blades.

Figure 2:
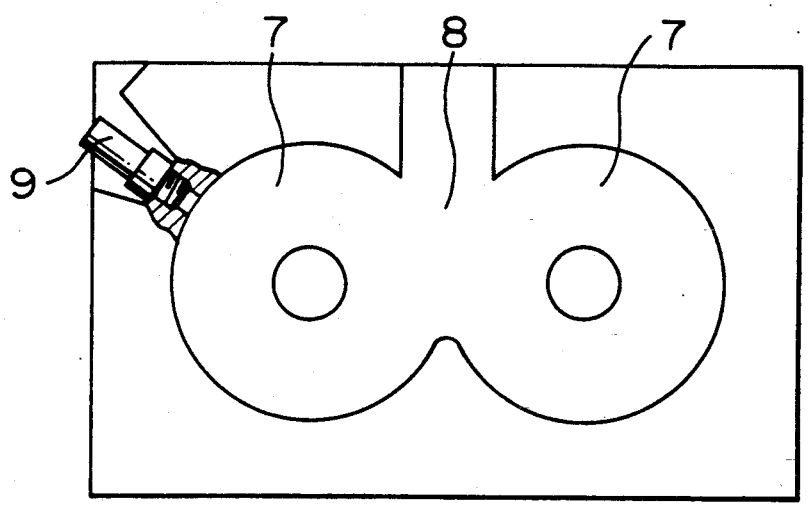
FIGS. 2 and 3 are a vertical cross-sectional view and a plan view of a two-dimensional model mixer of a horizontal-type biaxial kneader, showing a measured position of pressure on a peripheral wall within a mixing chamber.
Figure 3:
Figure 4:
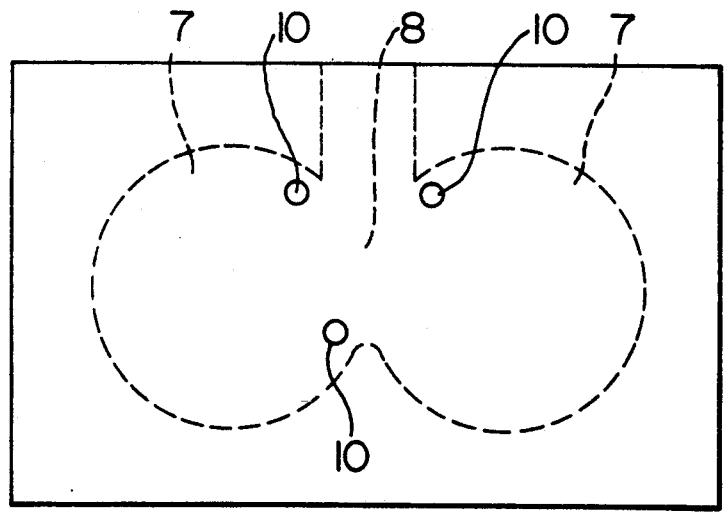
FIGS. 4 and 5 are an elevational front view and a horizontal cross-sectional view of the same mixer, showing measured positions of pressure on a side wall within the mixing chamber thereof.
Figure 5:
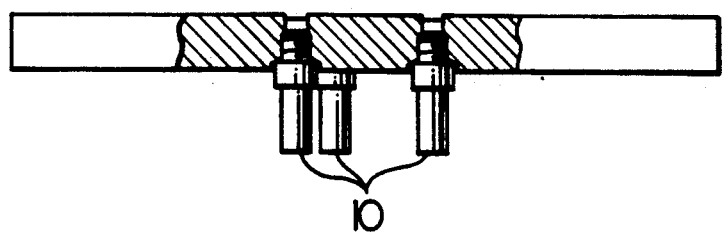

FIGS. 2 and 3 illustrate a two-dimensional model mixer of a horizontal-type biaxial kneader and a measured position of pressure on a peripheral wall within a mixing chamber, and FIGS. 4 and 5 illustrate measured positions of pressure on a side wall within the mixing chamber of the same mixer.

In this mixer, two mixing chambers 7 each having an inner diameter of 100 mm and a width of 19.7 mm are provided in juxtaposed relation, and these mixing chambers 7 are connected through an interposed region 8 below a ram and above a bridge. Rotor shafts 1 each including the rotor blade 1A (1B, 1C, 1D) are rotatably provided in parallel to each other within the two mixing chambers 7. These rotor blades are set to have a phase difference of 90° to rotate in directions opposite to each other so that rubber is interchanged between the mixing chambers 7.

On a peripheral wall within one mixing chamber 7, a pressure sensor 9 for measuring, from a side surface, a pressure variation between the front and rear sides of each wing of the associated rotor blade is fixed at one location shown in the drawings. Further, on a front side wall made of a transparent plate, pressure sensors 10 for measuring pressure variations in the region 8 below the ram and above the bridge are fixed at three locations shown in the drawings.

Using such a mixer with the rotor speed of 10.6 rpm and the rubber fill factor of 0.7, the mixing behavior of the rotor blades when a tracer was incorporated in the rubber was observed through the transparent plate and investigated.

FIGS. 6A, 6B, 6C and 6D respectively show pressure variations on the side wall within the mixing chambers 7 when the rotor blades 1A, 1B, 1C and 1D were used. In each of them, the solid, dotted and chain lines indicate the pressure variations at the location on the left side below the ram, the location on the right side below the ram and the location on the left side of the bridge, respectively. The ordinate designates pressure (MPa), and the abscissa designates time (second).

FIGS. 7A, 7B, 7C and 7D respectively show pressure variations on the peripheral wall within the mixing chamber 7 when the rotor blades 1A, 1B, 1C and 1D were used. The ordinate designates pressure (MPa), and the abscissa designates time (second).

As easily understood from FIGS. 7A, 7B, 7C and 7D, rubber was favorably separated from the peripheral walls of the mixing chambers 7 by any of those rotor blades, and there were exhibited similar pressure variations.

In this experiment, the temperature of the rubber on the peripheral walls within the mixing chambers 7 was approximately 32° C. to 46° C., and was the highest at the bridge.

The results of the above-described experiment lead to the following conclusions.

Figure 6:
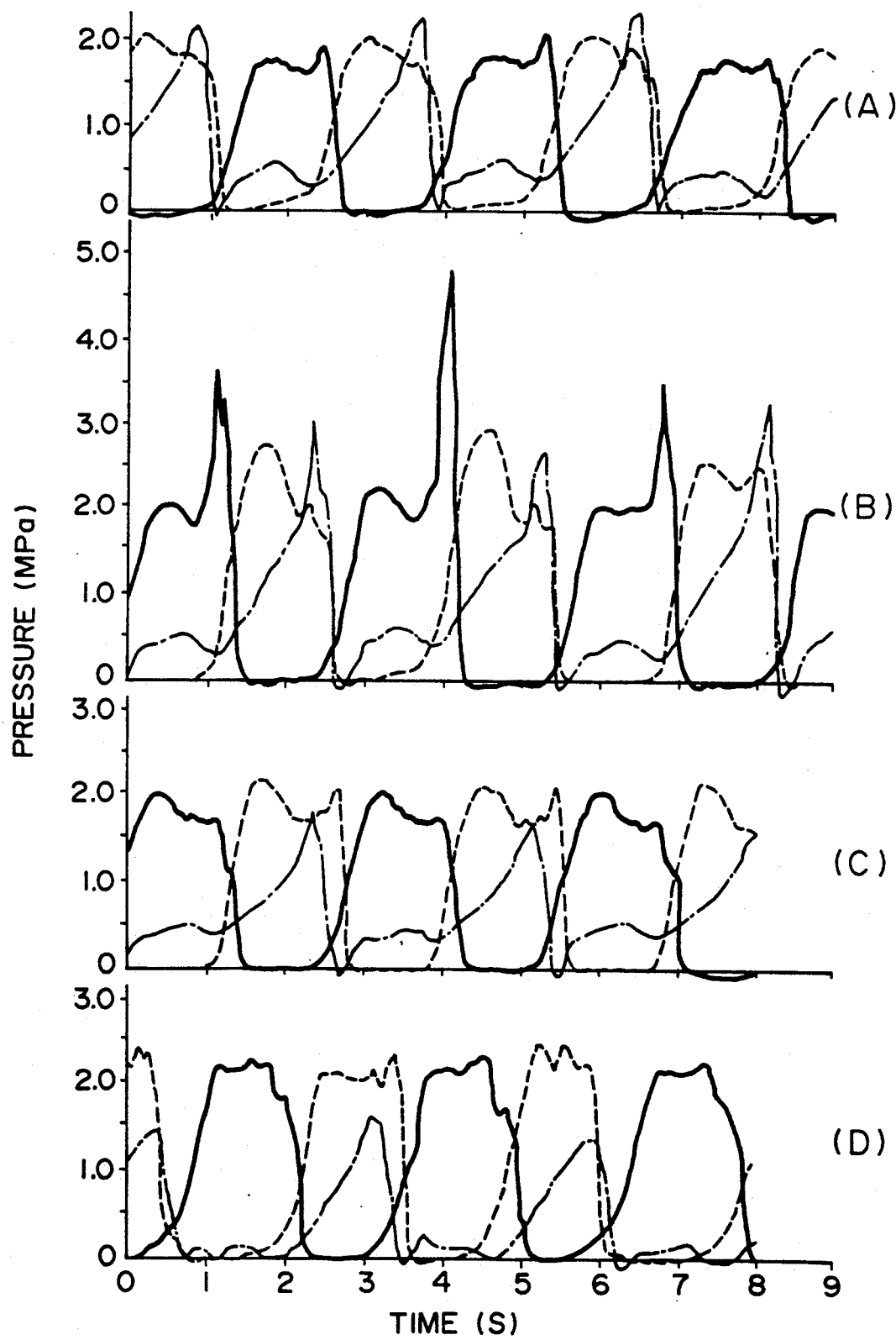
FIGS. 6A, 6B, 6C and 6D are graphs each showing pressure variations at a location on the left side below a ram (the solid line), a location on the right side below the ram (the dotted line) and a location on the left side of a bridge (the chain line) on the side wall within the mixing chamber when each of the rotor blades was used.
Figure 7:
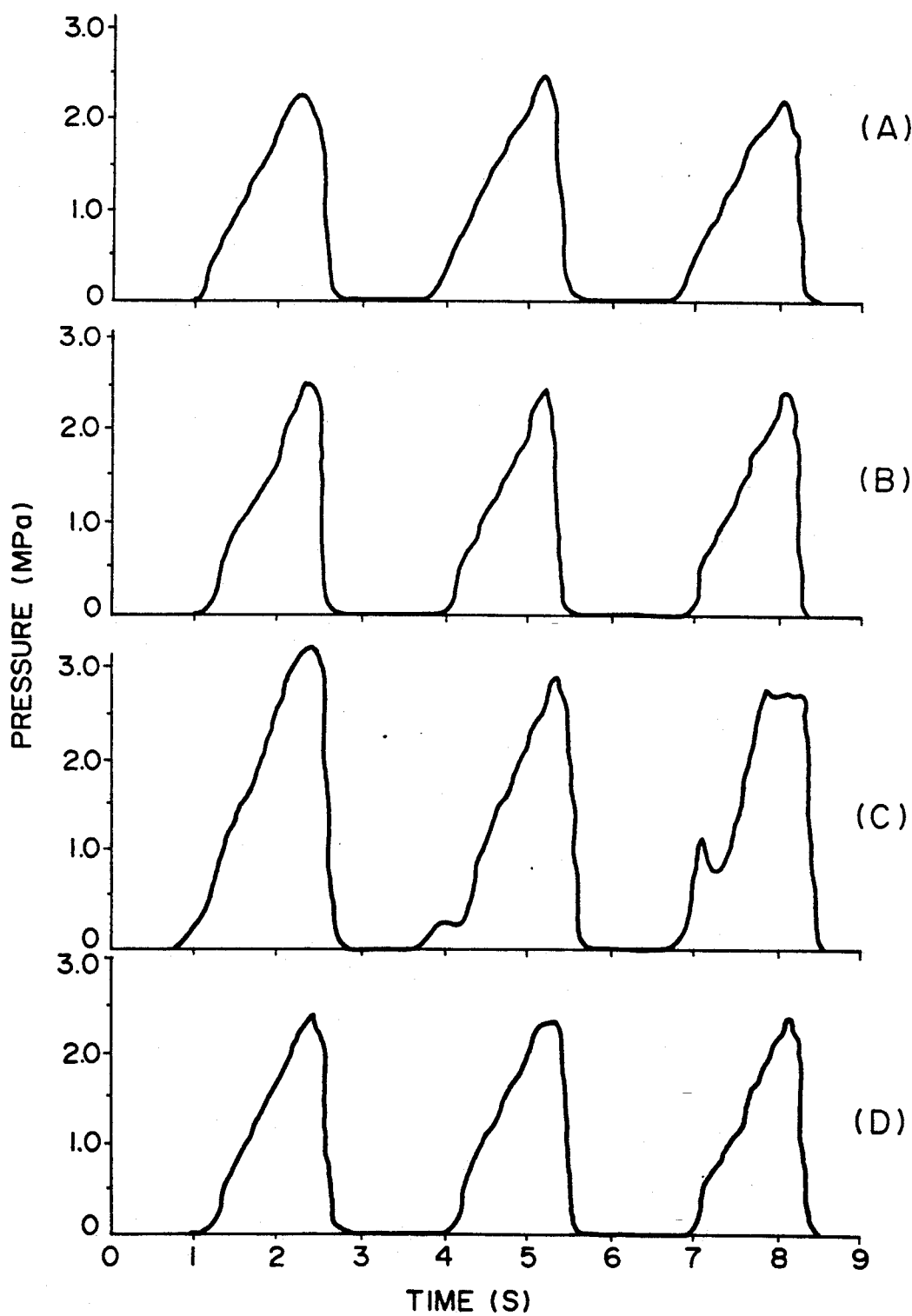
FIGS. 7A, 7B, 7C and 7D are graphs each showing a pressure variation on the peripheral wall within the mixing chamber when each of the rotor blades was used.
Figure 10:
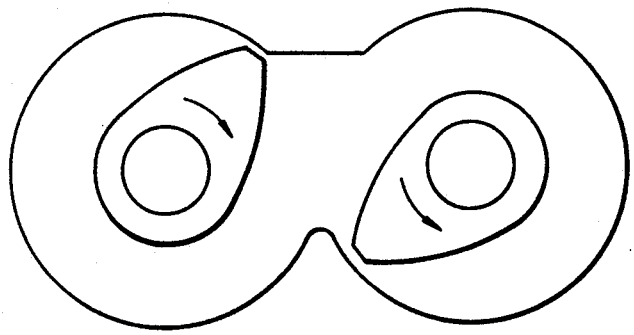
FIG. 10 is a schematic view showing a phase difference of rotor blades which enables the interchange of a mixing substance between the rotor blades.

Although the rotor blade 1A has substantially the same configuration as the rotor blade 1B, the clearance of the rotor blade 1A between the blade wing tip and the peripheral wall of the mixing chamber 7 is larger than the clearance of the rotor blade 1B, and it is 4 mm. As shown in FIG. 6A, therefore, a difference between the pressures on the left and right sides below the ram, i.e., a pressure gradient below the ram is smaller than in the case of the rotor blade 1B, and the interchange of the rubber is also smaller than in the case of the blade 1B. Consequently, the rubber can be mixed well, but the mixing proceeds somewhat slowly.

In the case of the rotor blade 1B, however, the clearance is smaller, and it is 2 mm. As shown in FIG. 6B, therefore, the pressure gradient below the ram is larger than in the case of the rotor blade 1A. Accordingly, the rubber in a region on the front side of each wing of the left rotor blade is forcedly delivered to an area in the vicinity of the rear-side edge (the straight portion 3) of each wing of the right rotor blade two times per rotation, e.g., at angles of 180° and 360°. This is considered from the fact that lateral movement or dispersion of the tracer rubber is larger than in the case of the rotor blade 1A, and the fact that a straight space is defined in the vicinity of the rear-side edge (the straight portion 3) of each wing of the rotor blade 1B. With each rotor blades 1B, the rubber can be mixed better and faster than in the case of the rotor blade 1A.

The rotor blade 1C has the same clearance as in the case of the rotor blade 1B, and it includes the concave portion 5 on the rear-side edge of each blade wing thereof for the purpose of making the amount of interchange of the rubber larger than in the case of the rotor blade 1B. It was confirmed that, with such rotor blades 1C, the lateral movement or dispersion of the tracer rubber is actually large, and the amount of the movement is also large. Besides, when the phase angle is 180°, the tracer rubber is forcedly advanced toward a region between the rear-side edge (the concave portion 5) of each wing of the rotor blade and the bridge, and when the phase angle is 270°, one part of the tracer rubber is introduced into the left mixing chamber. It was thus confirmed that the rubber can be interchanged more favorably than in the case of the rotor blade 1B and the rotor blade 1D which will be described below. In each of the mixing chambers, the rubber is attached for a length of about 10 mm on a peripheral wall on the rear side of each wing of the rotor blade. Thereafter it is separated from the rear side peripheral wall; it approaches the concave portion 5 on the rear-side edge of the blade wing; and it is divided in the middle and mixed with the rubber in a sickle-shaped zone on the front side of the other blade wing. As a result, with such rotor blades 1C, the rubber can be mixed rather well, and the mixing rate of the rubber is high.

The rotor blade 1D has characters both of the rotor blades 1B and 1C. In order to promote the separation of the rubber attached on the peripheral wall within each of the mixing chambers, the scrape angle $\delta$ on the rear side of the blade wing tip is set as 45°, thus increasing the negative pressure generated behind the blade wing. The space in the region 8 below the ram and above the bridge is smaller than in the case of the rotor blades 1B and 1C. The interchange of the rubber is good, and the behavior of the tracer rubber in this region 8 is similar to that in the case of the rotor blade 1C.

At the phase angle of 180° and 360°, however, because the straight portion 6 on the rear-side edge of each wing of the rotor blade 1D is long, and because the concave portion 5 on the same edge is small, the influence of the front-side edge of the other blade wing is smaller than in the case of the rotor blades 1A, 1B and 1C. This can be considered from the fact shown in FIG. 6D that, when the pressure on the left side below the ram is high, the pressure on the left side of the bridge is lower than in the case of the rotor blades 1A, 1B and 1C.

However, the rubber on a peripheral wall within each of the mixing chambers 7 is separated from the rear side of each wing of the rotor blade in parallel to the surface of the wing, and it is divided and mixed with the rubber in a sickle-shaped zone on the front side of the other blade wing, so that the rubber can be mixed rather well, and the mixing rate of the rubber is high.

As described heretofore, it was confirmed that the mixing of the rubber depends upon the interchange of the rubber between the two rotor blades in the region 8 below the ram and above the bridge between the two rotor blades within the mixer.

According to the present invention, there have been found blade wing configurations which enable preferable mixing of the rubber. With such a blade wing configuration, the rubber in a positive pressure zone (sickle-shaped zone) on the front side of the tip of each blade wing is forcedly delivered to the region 8 below the ram and above the bridge by the rotor blade within one of the mixing chambers 7, and after that, making use of the pressure gradient in this region 8, it is further advanced to a rubber transfer/mixing space (zero pressure or negative pressure zone) on the rear side of the tip of each wing of the rotor blade within the other of the mixing chambers 7, so that one part of the rubber can be transferred from one mixing chamber to the other at every rotation of the rotor blades.

When comparing the rotor blades 1C and 1D, the rotor blade 1D is preferred in respect of separation of the rubber from the chamber wall, and the rotor blade 1C is preferred in respect of the interchange of the rubber making use of the transfer space. Taking this factor into account, therefore, it can be suggested that the length of the straight portion 6 on the rear-side edge of each wing of the rotor blade 1D in a range of about 20 mm to 25 mm is shortened to about 10 mm, to thereby enlarge the concave portion 5, and that the scrape angle $\delta$ on the rear side of the blade wing tip in a range of 45° to 90° is changed to 30° to 45°, so that the blade wing configuration of the rotor blade 1D is modified to have a resemblance to that of the rotor blade 1C as close as possible In this case, the scrape angle $\delta$ on the rear side of the blade wing tip is likewise made larger than the bite angle $\gamma$ on the front side of the blade wing tip.

Figure 11:
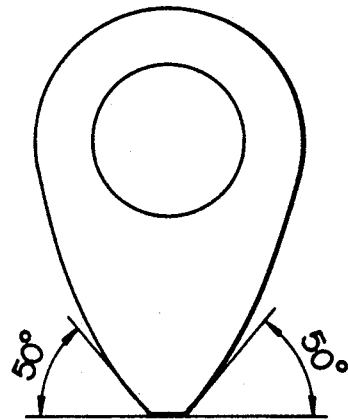
FIGS. 11 and 12 are cross-sectional views showing conventional rotor blades.
Figure 12:
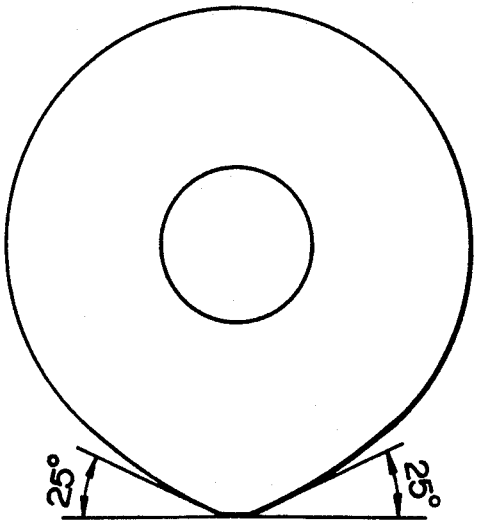

Among the factors of the cross-sectional configuration of the rotor blade, it is not yet clear how the clearance and the land width affect the rubber kneading effect of the rotor blades. However, it can be understood from the results of measurements of pressures on the peripheral wall of the mixing chamber 7 (see FIG. 7) that the pressure does not depend upon the clearance so much because the pressure peaks do not have great differences although only the clearance of the rotor blade 1A is 4 mm while the clearance of any of the rotor blades 1B, 1C and 1D is 2 mm. On the other hand, in the case of the rotor blade 1A having a land width of 3 mm on one blade wing and a land width of 4 mm on the other wing, the blade wing of the larger width serves to produce the larger pressure. In addition to this, taking into account the fact that, in the case of the conventional rotor blade having a lens-like cross-sectional configuration shown in FIG. 11, of which the clearance is about 3 mm and the land width is about 6 mm, the peak of the pressure on the peripheral wall is 5 MPa which is about two times as high as that of the rotor blade 1A, 1B, 1C, 1D, the land width can be said to raise the pressure in the positive pressure zone (the sickle-shaped zone). Further, in the case of the rotor blade 1C, the peak of the pressure on the peripheral wall is somewhat higher than that of the rotor blade 1B, 1D having the same clearance as the rotor blade 1C. It can be said that this is because the land portions of the rotor blade 1C are different from those of the rotor blade 1B, 1D in that they are not exactly in parallel to the peripheral walls within the mixing chambers, and that each of them is inclined with the front side of the blade wing tip being slightly raised up. Therefore, it can be understood that, when each of the land portions 4 is inclined with the rear side of the blade wing tip being slightly raised up, generation of the negative pressure is increased to thereby improve the separation of the attached rubber from the chamber wall.

As described above, according to the present invention, the scrape angle on the rear side of the tip of each wing of the rotor blade is made larger than the bite angle on the front side of the blade wing tip. Consequently, the transfer/mixing space for the content can be formed on the rear side of the blade wing without fail. Besides, the content in the positive pressure zone on the front side of the tip of each blade wing can be forcedly delivered to the region below the ram and above the bridge by the rotor blade within one of the mixing chambers, and after that, making use of the pressure gradient in this region, it can be further delivered to the above-mentioned space (zero pressure or negative pressure zone) on the rear side of the tip of each wing of the rotor blade within the other of the mixing chambers, thus enabling the interchange of the content between the rotor blades within the mixing chambers at every rotation of the rotor blades. When the rotary shafts equipped with the rotor blades having such a cross-sectional configuration are helically deformed in the axial direction, they are applicable enough to an actual apparatus, and they are effective in practical use.

What is claimed is:

1. A horizontal-type biaxial kneader comprising:
   two mixing chambers provided in juxtaposed non-overlapping contiguous relation, said mixing chambers being connected through an interposed region below a ram and above a bridge; and rotary shafts each equipped with a rotor bale including only two blade wings, said rotary shafts being provided in parallel to each other and rotatably within said two mixing chambers without interference between two loci of outer edges of said rotor blades, so that the content within the mixing chambers is interchanged between said mixing chambers by rotating said rotor blades in directions opposite to each other, wherein a scrape angle on the rear side of the tip of each blade wing is made larger than a bite angel on the front side of the same.

2. A horizontal-type biaxial kneader according to claim 1, wherein a concave portion is formed on the rear-side edge of each blade wing of said rotor blade.

3. A horizontal-type biaxial kneader according to claim 2, wherein a straight portion is formed on the rear-side edge of each blade wing of said rotor blade so as to be interposed between the tip of the blade wing and said concave portion.

4. A horizontal-type biaxial kneader according to claim 1, 2, or 3, wherein a configuration of each of said rotor blades is symmetrical with respect to a rotational axis of the rotary shafts.

* * * * *